United States Patent
Richter et al.

[11] Patent Number: 5,814,181
[45] Date of Patent: Sep. 29, 1998

[54] DEVICE FOR BUTT WELDING PIPES OF THERMOPLASTIC PLASTIC

[75] Inventors: Ulrike Richter, Ringstrasse 5, 36399 Freiensteinau-Holzmühl, Germany; Wilfried Hufnagel, Vienna, Austria

[73] Assignee: Ulrike Richter, Germany

[21] Appl. No.: 558,542

[22] Filed: Nov. 16, 1995

[30] Foreign Application Priority Data

Nov. 21, 1994 [DE] Germany ............................ 44 41 135.9
Oct. 3, 1995 [DE] Germany ......................... 195 36 857.6

[51] Int. Cl.$^6$ .................................................. B29C 65/20
[52] U.S. Cl. ...................... 156/351; 156/379.6; 156/499; 156/503; 156/158; 156/304.2; 156/304.6
[58] Field of Search .............................. 156/304.6, 304.2, 156/309.9, 158, 499, 350, 351, 379.8, 503; 261/41

[56] References Cited

U.S. PATENT DOCUMENTS 3,013,925  12/1961  Larsen .
5,378,141  1/1995  Aoki .

FOREIGN PATENT DOCUMENTS 27 34 910 B1  9/1978  Germany .
29 24 246  6/1980  Germany .
4026711  2/1992  Germany .
41 21 380 A1  1/1993  Germany .
43 29 072  3/1994  Germany .
90/00112  1/1990  WIPO .

*Primary Examiner*—Steven D. Maki
*Assistant Examiner*—Sam Chuan Yao
*Attorney, Agent, or Firm*—Larson & Taylor

[57] ABSTRACT

A device for butt welding pipes of thermoplastic plastic includes two pipe clamping units, aligned flush relative to each other, for clamping pipe ends therein. A first of the two units can be moved in the alignment direction by an electric motor and via mechanical drive elements. The reaction force corresponding to the infeed force is supported on the bottom via a support structure and a pipe end held in the second of the two units which is fixed in relation to the bottom. The mobile pipe end, held in the first pipe clamping unit, can be pressed against the fixed pipe end which is clamped in the second pipe clamping unit with a force measurable by a measurement device. In order to maintain a predetermined pressure course with greater precision and which is independent of changing environment conditions, the torque of the electric motor can be regulated in a closed control circuit as a function of the measurement values of a force, pressure, or torque measuring device which is disposed on a mechanical drive element of the mobile pipe clamping unit and, in fact, preferably on the drive element connected directly in front of this.

7 Claims, 6 Drawing Sheets

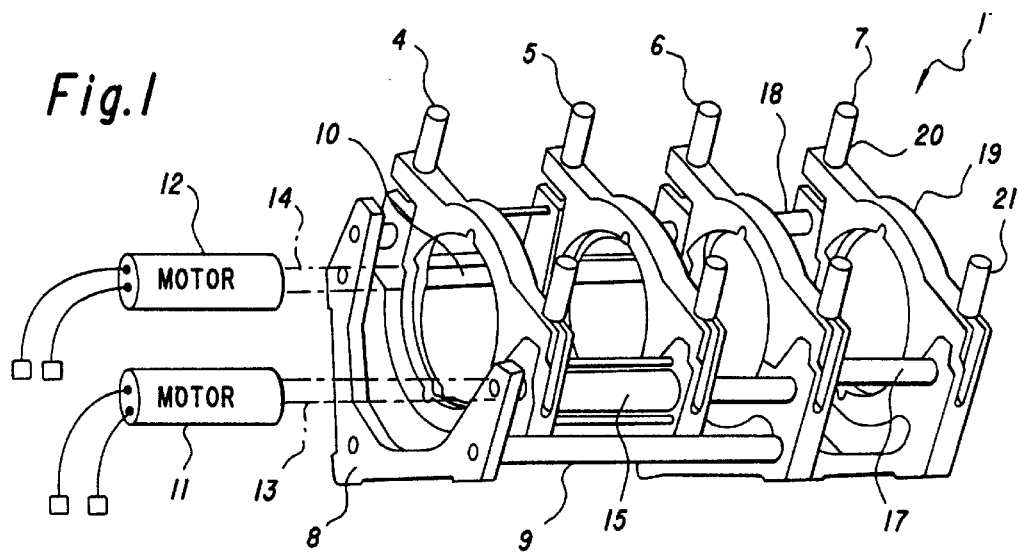
Fig.1
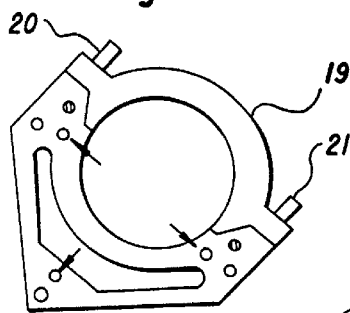
Fig.2a
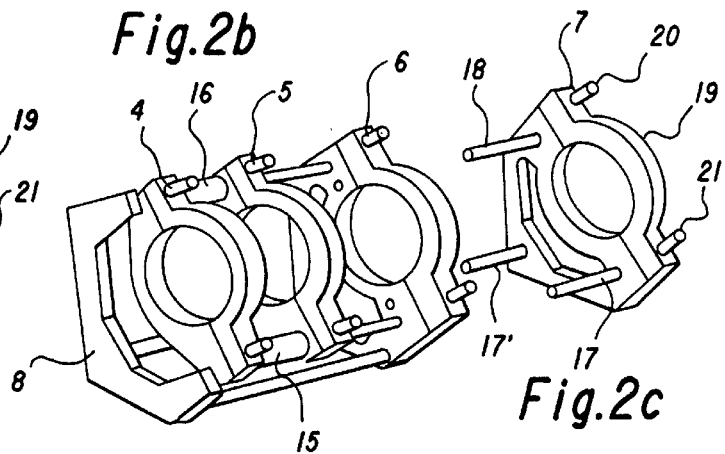
Fig.2b
Fig.2c
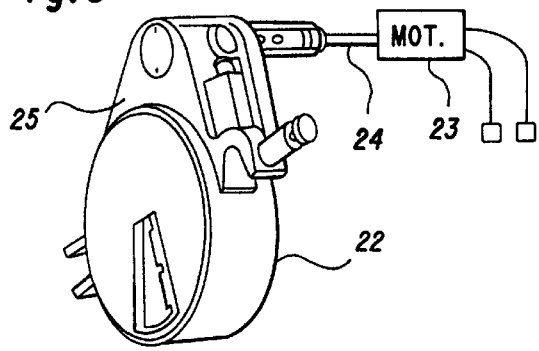
Fig.3
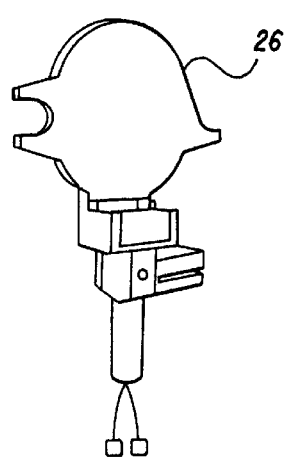
Fig.4

DEVICE FOR BUTT WELDING PIPES OF THERMOPLASTIC PLASTIC

BACKGROUND OF THE INVENTION

The invention relates to a device for butt welding pipes of thermoplastic plastic with two pipe clamping units aligned flush relative to each other, of which the one, having a pipe end clamped in it, can be moved in the alignment direction by an electric motor via mechanical drive elements and can be pressed against a pipe end, which is clamped in the other pipe clamping unit, with a force which can be measured by a measurement device.

In a known process, two plastic pipes are butt welded to each other in a workshop by taking the one pipe, which is clamped on a horizontally mobile cradle and heated on the front end to a welding temperature of 190°–225°, for example, and moving it by means of an electric motor, which can be controlled by an operator, against the end of the other pipe, which end has likewise been heated to welding temperature. In the known device, the latter pipe is supported on a fixed stop with the interposition of a force measurement device. This apparatus permits a very precise measurement of the pressing force of the pipes because the pressing force is measured separately from other forces, but it is only suited for welding individual pipe sections, not for the laying of a long pipeline.

When laying a gas line, for example, by welding PE, PP, or PVDF pipes in the field, other conditions prevail than when making individual welds in a workshop and these environmental conditions change constantly. The end of the already-laid, long train of pipes lies fixed, while according to the terrain, the other pipe section to be connected to the train of pipes lies so that it is horizontal, drops down, or rises to the welding location on changing ground, and has to be correspondingly guided to the welding location with a tensile or support force which fluctuates in great measure, and then has to be pressed with a predetermined force progression first against a heating device and then against the end of the train of pipes.

Up till now exclusively butt-welding devices with hydraulic clamping devices have been used in the field. A decisive reason for this may have been that the pipes to be welded normally lie in a very narrow trench whose cross section is an essential cost factor. With the hydraulic clamping devices, the drive unit can be set up outside the trench. In the trench, all that is needed are two force cylinders, located axially between the clamping brackets that encompass the pipe ends and exerting their force directly on the parts to be moved relative to each other; no rotating torque-transmitting members of a mechanical transmission train or drive train, which are sensitive to dirt on their contact surfaces, are needed. In addition, the clamping device essentially has the function of pressing the two pipe ends against the heating device or against each other for a longer time in the non-operative state. Therefore, a hydraulic pressure generator might seem more suitable than an electric movement drive. In the end, the pressure measurement by means of a manometer or another pressure measurement instrument on the outlet line of the pump is very simple and suitable because in the standard, hand-controlled devices, the control lever for controlling the pressure is also disposed there in the immediate vicinity. Like the also-known, program-regulated hydraulic butt-welding devices in which the pressure measurement device is likewise disposed on the pump outlet, it requires no measurement signal lines and control lines between the clamping device in the trench and the control or regulation device outside the trench.

Up to now, the precision of the control and regulation of the known butt-welding devices has been unsatisfactory. Because of the danger arising from defective welds, stringent demands are made, as revealed by the following description of the necessary functions of a device of this kind.

After aligning the pipe ends to be welded and clamping them into the welding device, the pipe section, 6 meters long or even more, that is to be welded to the existing train of pipes is normally moved toward the end of the train of pipes with a force of several hundred N, or in the case of large pipes even a force of several thousand N. On inclines, though, it can also happen that the pipe section tends to slip against the end of the train of pipes because of gravity. If need be, it must then be held by an opposing support force.

To prepare the welding location, a motor-driven, rotating plane is inserted into the clamping device so that it can travel axially between the pipe ends and is also pressed against the end of the train of pipes by means of the axial pressure of the pipe section to be welded. At a particular pressure, the rotating plane produces essentially plane-parallel face ends on the pipe ends, but some unevenness remains, at least where the cutting finally stops.

One may refer to FIG. 9 for what the rest of the operation is like. After the plane is removed, a disk-shaped heating device is inserted into the clamping device so that it can travel axially between the pipe ends and is also pressed against the end of the train of pipes by means of the pressure of the pipe section to be welded. For a particular length of time, which is called the matching time, the hot heating plate should be pressed relatively strongly against the planed face ends of the pipe ends in order to eliminate with certainty the unevenness remaining at the end of the preceding machining process and to optimally match the heated face ends in a plane-parallel manner. The matching pressure can have the same order of magnitude as the subsequent joining pressure to be exerted, which for PE pipes, for instance, is 0.15 $N/mm^2$ of face end area. As the pressure/time diagram of FIG. 9 shows, the pressure against the heating plate must then, however, be reduced to the very low value of 0.01–0.02 $N/mm^2$, for example, which is intended to guarantee only the reliable contact against the heating plate, so that during a particular warmup time, the material heats to a particular level, but is not displaced. The welding specifications demand that the deviations both from the predetermined high pressure during the matching time and from the low pressure during the warmup time be no more than 7%. This narrow limitation also applies below for the joining pressure, and to make matters worse, a particular device for laying pipe with different thicknesses and diameters is used and the required precision must be maintained over the entire working range.

After the warmup time, in order to prevent excessive cooling of the pipe ends, which have been heated to welding temperature, the pipe section to be welded on must, within a short reset time, be pulled back a little, the heating plate removed, and the pipe section pressed with its front face end against the end face of the train of pipes; the gradient of the pressure increase is established according to FIG. 9. When the joining pressure is reached, it must be kept constant during the cooling time. Depending upon the material, temperature, and pressure, more or less material is displaced during joining, so that a certain relative movement takes place between the pipes to be welded.

SUMMARY OF THE INVENTION

The object of the invention is to produce a device of the kind mentioned at the beginning which can be used not only in the workshop but also when laying pipe in the field, and which because of its principle of operation offers better conditions for the most accurate possible adherence to the predetermined pressure courses for heating and joining the pipe ends.

The above object is attained according to the invention by the fact that the torque of the electric motor can be regulated in a closed control circuit in dependency upon the measurement values of a force, pressure, or torque measurement device, which is disposed on a mechanical drive element of the mobile pipe clamping unit.

The capability of the novel device to be used for the laying of pipe in the field is due to the fact that unlike the known welding device for the workshop, which has an electromechanical drive, here the measurement device is disposed on a mechanical drive element of the pipe clamping unit, which can be moved with a motor. There, although it not only measures the force acting between the pipe ends but also superimposes the force required to move or support the pipe section to be welded to the train of pipes, nevertheless this force is known from the movements of the pipe section preceding the heating and joining procedures and can thus be subtracted, in the regulating device, from the overall force measured. In uncertain situations, a short intermediate movement of the pipe section can be initiated in order to measure the movement force once more, before determining the overall force required to achieve a particular pressure of the pipe section against the heating plate or against the end of the train of pipes.

Since a closed control circuit is provided, the fact that the measurement device is disposed on the clamping device in the trench does not play a significant role. For regulation purposes, the measurement values determined on a mechanical drive element, e.g. by means of a strain gauge, must be converted into electrical signals anyway, and with the regulation and control device placed outside the trench, can also easily be displayed on a monitor. In any case, the measurement values are very precise because only mechanical drive elements and clamping brackets, at which no unpredictable internal or external interfering forces occur, are disposed between the measurement value transducer and the clamped pipe section. Preferably, the transducer is even disposed between the mobile pipe clamping unit and the mechanical drive element connected immediately in front of it, so that there are no parts which move in relation to each other between the transducer and the pipe clamping unit.

In comparison to the known controllable or regulable hydraulic clamping devices, the gain in precision results essentially from the fact that in the known devices, the pressure measuring device on the pump outlet is disposed upstream in the flow direction from a pressure compensation receptacle and the pressure hose to the force cylinders on the pipe clamping units. The hydraulic system reacts in a sluggish and temperature-independent manner, so that during regulation it fluctuates around the desired values with relatively large deviations. In contrast, the regulation of an electric motor is temperature-independent and reacts very quickly to deviations from the desired value. The motor supplies a particular torque over the entire working range and essentially faster speed changes than a hydraulic device so that the reset time necessary for removal of the heating device between heating and joining can be shortened and the cooling in this phase can be reduced. Further advantages of the electric drive are comprised in that it is maintenance free and requires no oil.

The previous, relatively coarse control and regulation was based exclusively upon pressure or force measurements. In a preferred embodiment, the invention goes one step further and, at least during the joining, registers the relative movement between pipe clamping units in order to compare the measurement values to particular desired values and in this way, to automatically discover possible defects of the weld connection. The determination of the joining path and the joining speed with the required precision creates no difficulties with an electric drive because an incremental transducer or pulse transducer connected to the motor resolves the path in sufficiently small steps. If the relative moment when joining with the predetermined joining pressure is too fast or too slow and/or the joining path is too short or too long, then the welding outcome can be corrected if need be by means of an adapted pressure change; in any case, though, such irregularities found during the welding procedure mean that the quality of the weld should be inspected after it is produced, or possibly that the welding process should even be interrupted.

In a corresponding way, the relative movement of the pipe clamping units can also be monitored while the pipe ends are heated to welding temperature by axial pressure against the heating device.

In another preferred embodiment of the invention, an additional control and reliability against measurement error is obtained by the fact that the measurement values of the measurement device disposed on a drive element of the mobile pipe clamping device are compared to simultaneously measured values of the current consumption of the electric drive motor. Since the current consumption is also a measure for the infeed force, the deviations between the force values measured on the mechanical drive train and the values for the infeed force determined from the current consumption should not exceed a particular measure.

The current monitoring can also be expanded to the rotating plane driven by an electric motor. If there is a deep indentation in one of the pipe end faces to be welded, then this becomes noticeable during the plane operation by means of an interrupted cut and therefore also becomes apparent in the current consumption curve. By monitoring the current consumption of the plane, it can be determined first whether there are indentations or other irregularities in the surfaces to be welded and then the planing procedure can be automatically continued until the irregularities have been eliminated.

BRIEF DESCRIPTION OF THE DRAWINGS

Different exemplary embodiments of the pipe welding device according to the invention will be explained below in detail from the accompanying drawings.

FIG. 1 shows a perspective representation, partially in an exploded view, of a clamping device, which can be driven electrically, having two pipe clamping units, each of which is affiliated with two pipe clamping devices firmly connected to each other axially;

FIG. 2 shows another perspective representation, partially in an exploded view, of the clamping device according to FIG. 1;

FIG. 3 shows a perspective representation of a pipe plane for smoothing the end faces of the pipe to be welded;

FIG. 4 shows a perspective representation of a plate-shaped heating element for heating the pipe ends to be welded up to the welding temperature;

DETAILED DESCRIPTION OF THE INVENTION

Figure 5:
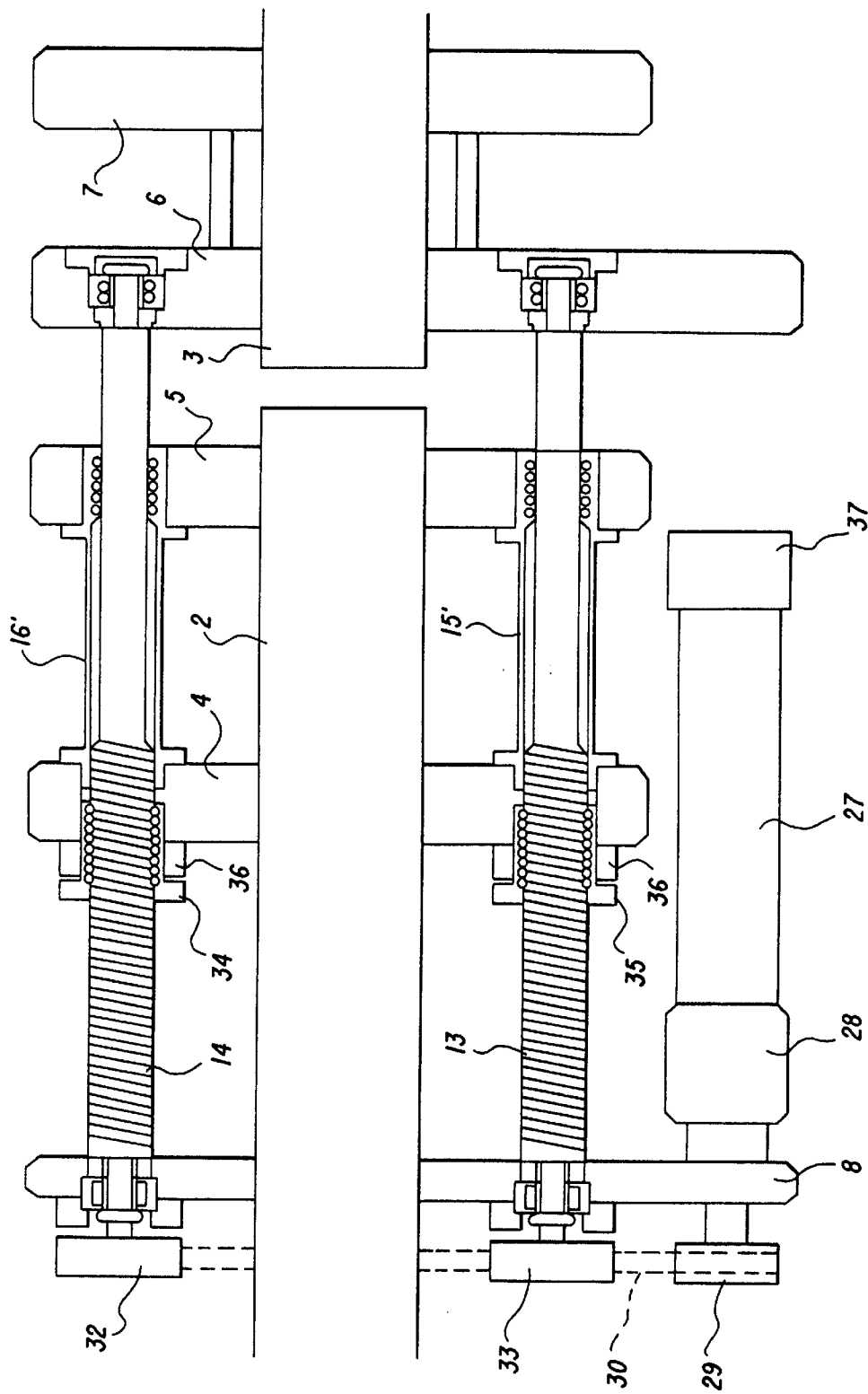
FIG. 5 shows an axial longitudinal section through an embodiment of a clamping device which can be driven by an electric motor and is modified in comparison to FIGS. 1 and 2.

FIG. 1 shows the essential part of a device for butt welding pipes made of thermoplastic plastic, namely a clamping device 1, which has two pipe clamping devices for clamping two pipe ends 2, 3 (see FIG. 7) to be connected to each other, of which one clamping device is comprised of two pipe clamping elements 4, 5 firmly connected to each other axially and the other is likewise comprised of two pipe clamping elements 6, 7 firmly connected to each other axially. The clamping elements 6, 7 are firmly connected to a support structure which is affiliated with an element 8 on the other end of the clamping device 1. In addition, the support structure is affiliated with two axles 9, 10 disposed with spacing between them, along which the clamping elements 4, 5 can be moved as a unit relative to the clamping elements 6, 7, wherein the clamping elements 4–7, which are aligned in a straight line one behind the other, remain in axial alignment.

Two electric motors 11, 12 are provided to carry out the movement procedure, which drive threaded spindles 13, 14 to rotate, which are supported so they cannot move axially and can rotate parallel to the axles 9, 10 in the support structure and cooperate with internal threads non-rotatably mounted on the clamping elements 4 and/or 5. In the exemplary case, the clamping elements 4 and 5 are connected to a rigid pipe clamping unit by means of connecting bolts 15, 16 so that when one of these clamping elements is axially driven by the threaded spindles 13, 14, it carries the other clamping element along with it. To clamp the pipe ends 2 and 3, each of the essentially annular clamping elements 4–7 is divided in the center, wherein the one half constitutes a clamping piece 19, which can be firmly clamped by means of threaded bolts and nuts 20, 21 which can be adjusted by hand. Filler elements, not shown, can be inserted into each clamping element 4–7 to make them fit various pipe diameters.

FIGS. 2 a–c show a partially disassembled clamping device 1 in order to clarify its construction. FIG. 2 a shows an end view of a pipe clamping element and in an exploded view, the assembly drawings of FIGS. 2 b and 2 c show the connection of the clamping element 7 to the clamping element 6 by screw connection by means of bolts 17, 17', and 18.

Figure 7A:
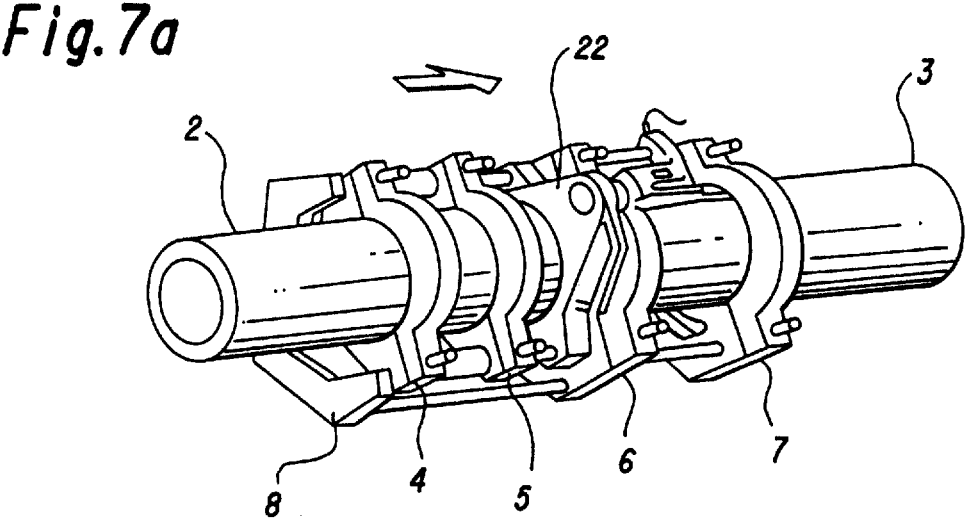
FIG. 7 shows a perspective representation of the pipe clamping element according to FIGS. 1 and 2, with clamped pipe ends in various phases of the work, namely A) when planing, B) when heating, and C) when joining.
Figure 7B:
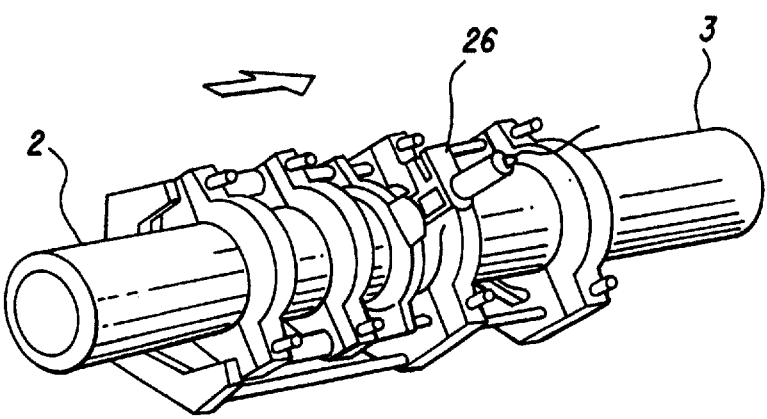
Figure 7C:
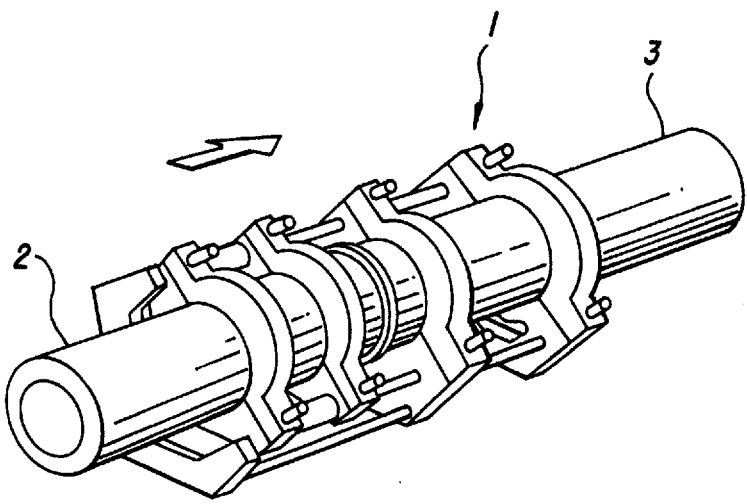

FIG. 3 shows a perspective representation of a pipe plane 22, which is known in and of itself and is for planing the face ends of the pipe ends 2 and 3 to be welded. Its use is shown in FIG. 7 A. The rotation drive of the pipe plane 22, which works with rotating knives, is executed with the aid of an electric motor 23, which is connected to the gear unit 25 of the plane via a rigid or flexible shaft 24.

FIG. 4 shows a plate-shaped heating element 26, whose use is shown in FIG. 5 B. It can be heated directly or indirectly via a heat conductor. In the latter instance, the heat is transmitted by embedded electric heating bodies or heat carriers to the surface of the heating element by means of a positively heat conductive material. With the directly heated element 26 shown in FIG. 4, the heat is generated by an electric resistor and conveyed directly to the pipe ends. In this case, the electric resistor, which is embodied as a heating band, heating coil, or heating ring, is used as the heating element itself. In both form and dimensions, the heating element 26 must be made to fit the joining faces of the pipe ends 2 and 3. The faces of the pipe ends to be welded must lie within the opposing, plane-parallel useful faces of the heating element 26. In this case, the useful face is the part of the heating element in which the temperature and the heat quantity to be conveyed can be regulated within the required range. The surface of the heating element 26 is normally provided with a layer or covering, e.g. of PTFE, polished or otherwise finished in order to prevent the heated thermoplastic plastic from adhering to it.

In the above-described exemplary embodiment, it is not shown that between the pipe clamping units 4, 5 and 6, 7, which can be moved in relation to each other, pressure and temperature sensors are disposed whose measurement values can be supplied to a control and regulation device, which is connected to a programmable computer, which automatically controls the individual operating cycles for the entire welding process by using values received from the sensors.

Figure 6:
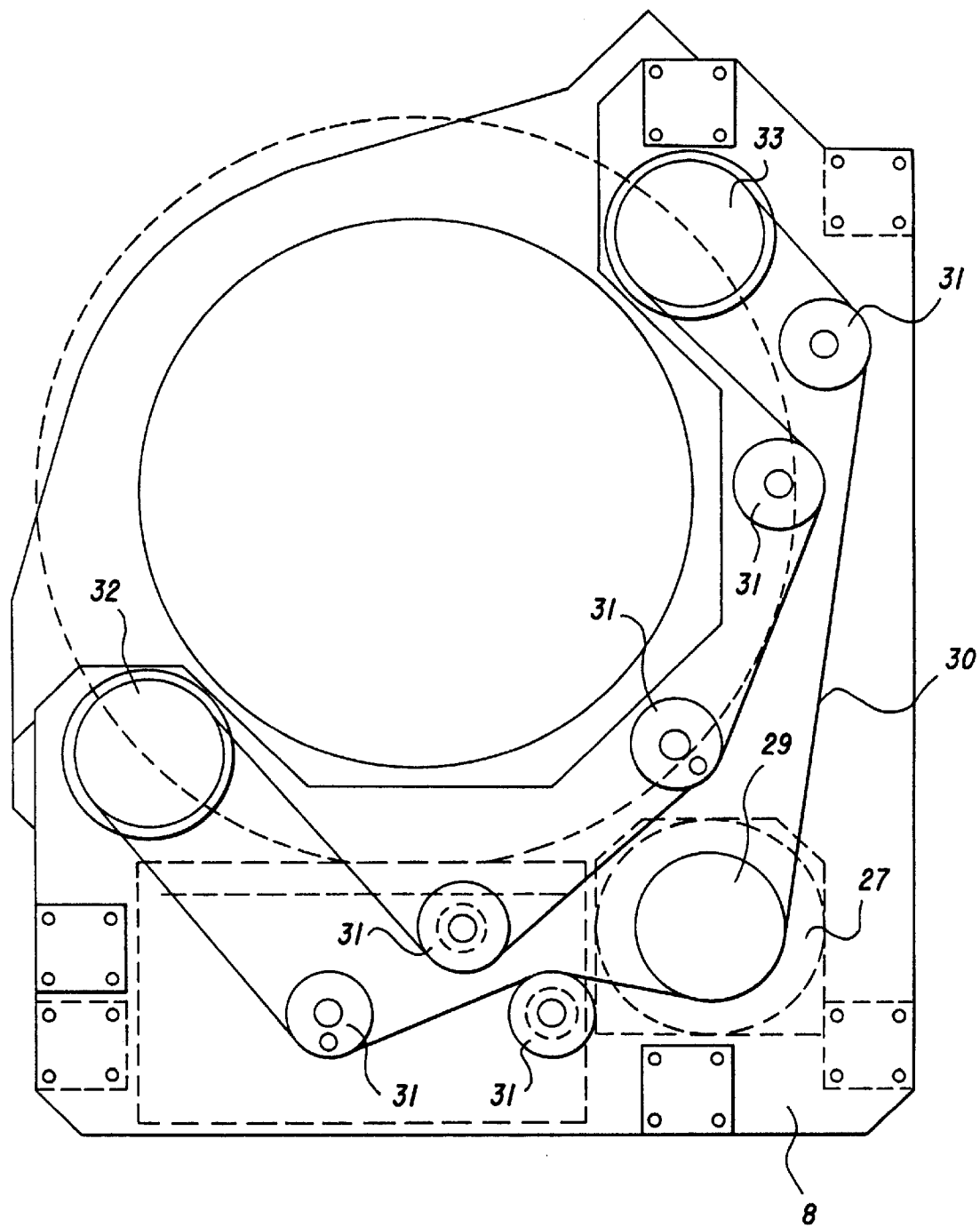
FIG. 6 shows a simplified cross section through the clamping device according to FIG. 5.

While in the embodiment according to FIGS. 1 and 2, the driving of the two threaded spindles 13, 14 is accomplished individually by means of respective motors 11, 12 which have to be electrically controlled in a synchronous manner, an exemplary embodiment is shown in FIGS. 5 and 6 in which both threaded spindles 13, 14 are driven by a single motor 27. This is fastened together with a flanged gear unit 28 in an axially parallel position next to the threaded spindles 13, 14 on the element 8 on the end of the support structure and drives a toothed belt pulley 29 which transmits the torque via a tooth belt 30, which according to FIG. 6 runs via a plurality of deflection and stretching rollers 31, to pulleys 32, 33 non-rotatably connected to the threaded spindles 13, 14.

With the clamping device according to FIGS. 5 and 6, the threaded spindles 13, 14 in the clamping element 6 and in the end element 8 of the support structure are radially supported by means of roller bearings. The axial bearing of the threaded spindles 13, 14 is disposed in the clamping element 6. This clamping element 6 and the clamping element 7, which is firmly connected to it axially via the bolts 17, 18, are firmly clamped to the end 3 of the already-laid, long train of pipes. The clamping elements 4 and 5 firmly clamped to the end 2 of a pipe section to be welded to the train of pipes 3 are rigidly connected to each other by means of distance bushes 15', 16' which are disposed coaxial to the threaded spindles 13, 14, which are guided through them. The threaded section of the threaded spindles 13 and 14 extends only as far as the movement path of the clamping device 4. The clamping element 5 is merely guided so that by means of rolling bodies, it can travel axially on a frontal part of the threaded spindles 13, 14 which is not provided with threads.

In the exemplary embodiment according to FIG. 5, the threaded spindles 13, 14 are recirculating-ball spindles which cooperate with recirculating-ball nuts 34, 35 which are non-rotatably attached to the clamping element 4. The latter, though, do not transfer the pressure forces exerted on them by the threaded spindles 13, 14 directly onto the clamping element 4 and the clamping element 5 connected to this via the distance bushes 15', 16', but with the respective interposition of a force measurement device 36 which in the exemplary case has the shape of a ring, which is supported on the clamping element 4 by means of two projections which are disposed diametrically opposed to each other and is respectively supported on a recirculating-ball nut 34 or 35 by means of two other axial projections offset from the former ones by 90° and carries strain gauges between each pair of projections. When pressure loaded, the four sections of the ring bend between the projections and the elastic deforming of the ring measured by means of the wire strain gauges is a measure for the pressure force transferred by the ring onto the clamping element 4. The disposition of four wire strain gauges, which are connected in the form of a Wheatstone bridge, produces a more precise measurement result than is achieved with only a single wire strain gauge on an intermediary member, which can be elastically deformed by the force transferred by a recirculating-ball nut 34, 35 onto the clamping element 4.

It goes without saying that the measurement device 36 can also be disposed on another mechanical drive element of the mobile pipe clamping unit 4, 5 and can also function as a pressure measurement device or torque measurement device, for example. In the disposition of the measurement device 36, which in FIG. 5 is shown directly between the pipe clamping unit 4, 5 and the drive element 34, 35 directly in front of it, there is, however, the advantage that just the external force acting upon the mobile pipe end 2 is measured and no further frictional forces have to be taken into consideration.

The chosen arrangement of the measurement device in the mechanical drive train of the mobile pipe clamping unit 4, 5 takes into consideration the fact that the pipe end 3 of the already-laid, long pipeline has been definitely fixed. In contrast to a clamping device which is only used in a workshop, it is thus not possible to measure the opposing pressure of the pipe ends 2,3 by a force measurement device which is connected between the pipe clamping unit 6, 7 and a support structure supported on the bottom. Because of the normally definite, fixed position of the pipe end 3 of the already-laid pipeline, it is also of no principal significance whether the support structure 8, on which the motor 27 is supported, is axially supported on the bottom or on the end 3 of the pipeline. The latter embodiment merely has the advantage that the anchoring of the support structure 8 by means of the pipe clamping unit 6, 7 firmly connected to it to the fixed pipe end 3 is simple and quick to carry out. Regardless of whether the threaded spindles 13, 14, which constitute a part of the support structure, are axially supported on the bottom or on the end of the fixed train of pipes 3, it is naturally also possible, using a force measurement device which corresponds to the measurement device 36, to measure the reaction force supported on the axial bearing of the threaded spindles 13, 14, which force corresponds to the infeed force exerted upon the driven pipe clamping unit 4, 5.

Only pressure forces need be measured with the measurement device 36. This is sufficient for practical use. When it is taken into account that on an incline, the end 2 of the mobile pipe section has the tendency, because of gravity, to press against the pipe end 3, in order to measure the support force to exert against this, another respective measurement device 36 can be provided, with reference to FIG. 5, on the right side of the clamping element 4 between this and a right end flange of a recirculating-ball nut 34, 35, which in this case extends axially, completely through the clamping element 4. Otherwise, the preferred drive of the pipe clamping unit 4, 5 via helical gearing 13, 35 and 14, 34 has the advantage that in the event of a failure of the electrical drive, they hold the pipe end 2 by means of their self-locking effect.

As can be seen from FIG. 5, an incremental transducer 37 is affixed to the electric motor 27, which transducer detects the rotational path of the armature of the motor in small angular steps, wherein each angular step corresponds to a very small movement path of the pipe clamping unit 4, 5. With this path measurement device and if need be a clock unit in the control and regulating device of the motor 27, it is possible to precisely detect the relative movement of the pipe ends 2, 3 when joining, that is, the joining path and the speed of the pipe ends as they press against each other, and to compare it to the predetermined desired values. In the same manner, the deforming of the pipe ends 2, 3 during the heating process can be controlled and, if desired, logged. In addition, deviations from the predetermined desired values of path and/or speed can be included in the regulation of the motor torque with which the infeed force of the pipe end 2 is generated.

Because of the dependency of torque on the current consumption of the motor 27, this consumption is also preferably detected by the regulating device and compared to the measurement values of the measurement device 36. Deviations between the torque or force values calculated from the current consumption and the measurement values of the measurement device 36 on the clamping device 4 could be caused by fluctuating friction in the drive train of the mobile pipe clamping unit 4, 5.

Figure 8A:
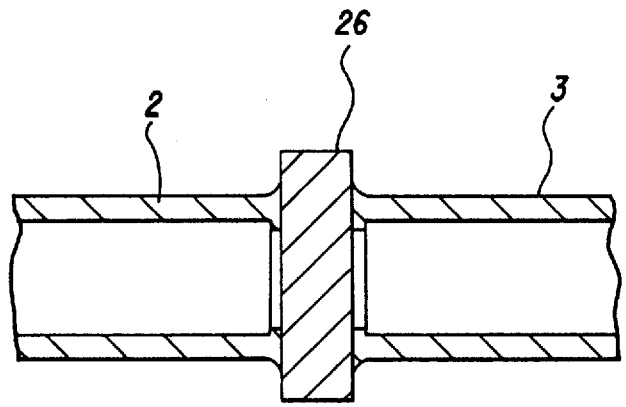
FIG. 8 shows a schematic representation of the work procedures, namely A) when heating, B) when joining, C) when the connection is complete.
Figure 8B:
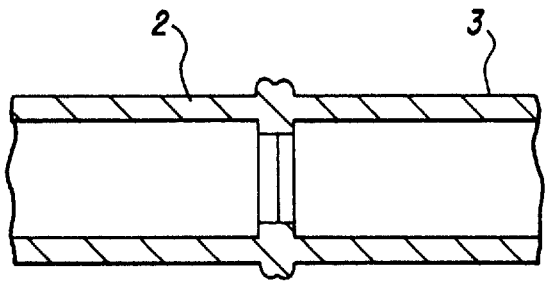
Figure 8C:
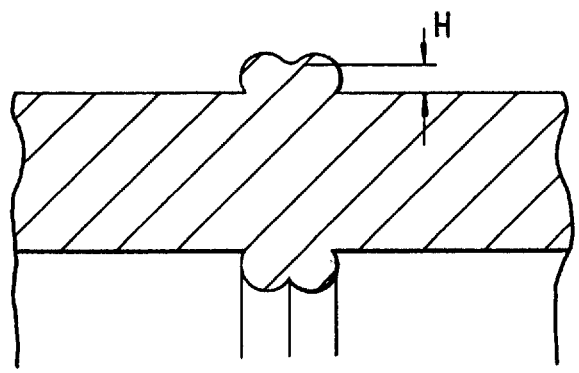
Figure 9:
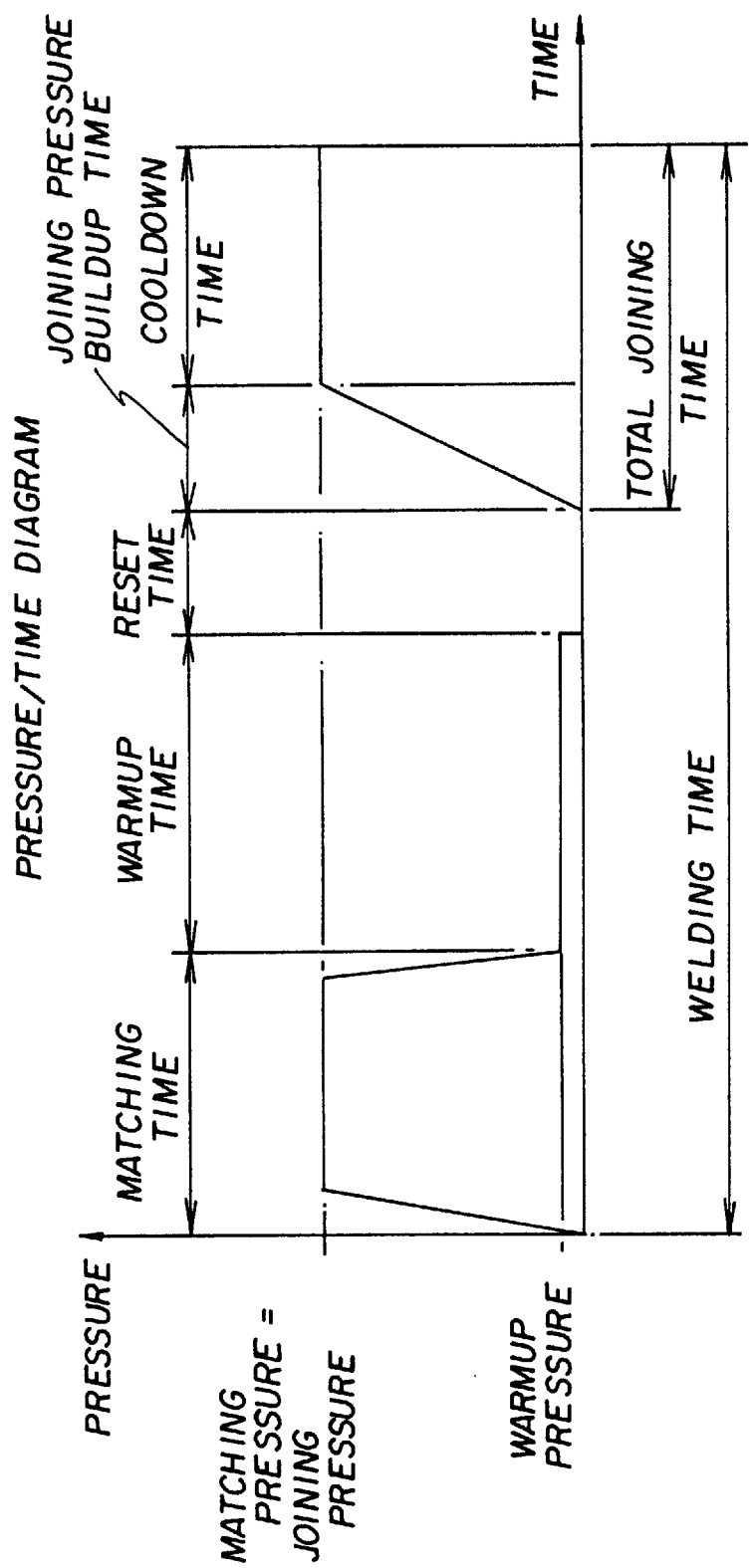
FIG. 9 shows a pressure/time diagram of the entire welding process.

FIGS. 7 A–C, in connection with FIGS. 8 A–C and FIG. 9, show the different steps of the process: First, according to FIG. 7 A, the pipe ends 2 and 3 are planed flat on their face ends with the aid of the plane 22. For this purpose the pipe ends 2 and 3 as well as the plane 22 are clamped into the clamping device 1 so that the plane, which is supported so that it can travel axially, contacts both pipe ends. Then, the motors 11, 12 according to FIG. 1 or the motor 27 according to FIG. 5 and the drive motor 23 of the plane 22 are switched on and the entire process is controlled with the aid of a control device, not shown in detail. As mentioned above, the monitoring of the current consumption of the motor 23 reveals whether there are indentations or irregularities in the face ends of the pipe ends 2, 3.

Then, the plane 22 is removed and the heating element 27 is inserted into the clamping device 1, between the pipe ends 2, 3, as is shown in FIG. 5 B. The heating device 26 is also supported on the support structure in an axially mobile manner so that after the retraction of the pipe end 2, which is suited for the removal of the plane 22, and its subsequent forward motion in the direction of the pipe end 3, the heating device 26 is clamped between the two pipe ends 2, 3.

As shown in FIG. 9, in a first phase, the pipe ends 2, 3 are pressed against the heated heating plate for a particular matching time with a particular matching pressure. In this connection, a limited deforming of the heated material should occur, so as eliminate irregularities that could possibly exist after the cutting work. After this limited deforming, which leads to the absolute plane-parallel matching of the face ends of the pipe ends 2, 3 to be welded, the pressure on the pipe ends is reduced to the point that only a heat transmitting contact with the heating element is guaranteed, but no further deforming takes place. Otherwise the heated material would be displaced and as a result, the depth of the heated zone would be reduced.

After the warmup time shown in FIG. 9, the pipe ends 2, 3 have the temperature required for welding. Now, within a short reset time, the pipe end 2 must be retracted by the pipe clamping unit 4, 5, the heating device 26 must be removed, and then for joining, the pipe end 2 must be moved forward again and pressed against the pipe end 3. The joining pressure is built up with a particular gradient and then maintained during a particular cooling time, as can be seen from FIG. 9. The joining is shown in FIGS. 7 C and 8 B. FIG. 8 C then shows a longitudinal section through the complete welded connection.

We claim:

1. A device for butt welding pipes comprising a thermoplastic plastic, said device comprising a support structure, means for heating ends of said pipes to a particular welding temperature, a first pipe clamping unit connected to said support structure for clamping a first of said pipe ends therein, and a second pipe clamping unit connected to said support structure for clamping a second of said pipe ends therein, said first and second clamping units being aligned flushed relative to each other, said first pipe clamping unit being movable relative to said support structure in a direction of alignment of said pipe ends by an electric motor via mechanical drive elements comprising at least one rotatable driven threaded spindle being axially affixed on one of the pipe clamping units and cooperating in a self-locking manner with a nut nonrotatably and in both axial directions drivingly connected to the other of the pipe clamping units for pressing said first pipe end clamped therein against the second pipe end clamped in the second pipe clamping unit, which is fixed relative to said support structure, with a force rising with a predetermined gradient measurable by a measurement device, the torque of the electric motor being regulated in a closed control circuit as a function of measurement values of at least one of a force, pressure, and torque of said measurement device, said measurement device being disposed on at least one of said mechanical drive elements of the first pipe clamping unit.

2. The device according to claim 1, wherein the measurement device is disposed between the first pipe clamping unit and the mechanical drive element connected directly in front of it.

3. The device according to claim 1, wherein the second pipe end disposed in a stationary manner, via the second pipe clamping unit provides means for supporting reaction force of the axial infeed force generated by the electric motor.

4. The device according to claim 1, wherein the electric motor acts upon two nuts via two threaded spindles driven to rotate, the two nuts being disposed in diametrical opposition on the first pipe clamping unit non-rotatably connected to them, each of the two nuts exerting an axial force upon the first pipe clamping unit via a measurement device.

5. The device according to claim 4, wherein the measurement devices include members which are bent when the nuts are axially loaded and on which wire strain gauges are affixed.

6. The device according to claim 5, wherein said bent members comprise rings which on one axial side are respectively supported on the nuts via a first two diametrically opposed axial projections and on the other axial side are supported on the first pipe clamping unit disposed on the circumference, offset from the first two projections by 90°, wherein wire strain gauges are affixed respectively between the projections on the ring.

7. The device according to claim 1, wherein said nut comprises a recirculating-ball nut.

* * * * *